(12) United States Patent
Beskrovny et al.

(10) Patent No.: US 10,178,146 B2
(45) Date of Patent: Jan. 8, 2019

(54) WEB SERVICES

(71) Applicant: INTERNATIONAL BUSINESS MACHINES CORPORATION, Armonk, NY (US)

(72) Inventors: Evgeny Beskrovny, Ramat Gan (IL); Omer Tripp, Bronx, NY (US); Emmanuel Wurth, Toulouse (FR)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 14/092,494

(22) Filed: Nov. 27, 2013

(65) Prior Publication Data
US 2014/0195597 A1 Jul. 10, 2014

(30) Foreign Application Priority Data
Jan. 10, 2013 (GB) .................................. 1300415.5

(51) Int. Cl.
*H04L 29/08* (2006.01)
(52) U.S. Cl.
CPC .............. *H04L 67/02* (2013.01); *H04L 67/16* (2013.01); *H04L 67/2809* (2013.01)
(58) Field of Classification Search
CPC ...... H04L 67/16; H04L 67/2809; H04L 67/02
USPC ......................................................... 709/203
See application file for complete search history.

(56) References Cited

U.S. PATENT DOCUMENTS

| 6,918,084 | B1 * | 7/2005 | Slaughter ............... G06Q 30/02 709/217 |
| 7,188,155 | B2 * | 3/2007 | Flurry et al. .................. 709/219 |
| 7,269,603 | B1 * | 9/2007 | Dewan .................... G06F 9/465 |
| 7,293,021 | B1 * | 11/2007 | Rafnsson .......... G06F 17/30867 |
| 7,457,870 | B1 * | 11/2008 | Lownsbrough ..... H04L 41/5058 709/217 |
| 7,716,492 | B1 * | 5/2010 | Saulpaugh .............. G06F 9/465 709/220 |
| 7,890,484 | B1 * | 2/2011 | Hall ............................. 707/705 |
| 7,966,320 | B2 | 6/2011 | Roshen |

(Continued)

FOREIGN PATENT DOCUMENTS

| CN | 1489044 | 4/2004 |
| CN | 101873323 A | 10/2010 |
| WO | 2009064239 A1 | 5/2009 |

OTHER PUBLICATIONS

GB Application No. 1300415.5—UK IPO Search Report dated Jul. 24, 2013.

(Continued)

*Primary Examiner* — Philip J Chea
*Assistant Examiner* — Wing Ma
(74) *Attorney, Agent, or Firm* — Yee & Associates, P.C.; Maeve Carpenter

(57) ABSTRACT

A method, system, and/or computer program product invokes a web service in a software application. A software application comprises a machine readable description of a functionality to be supported by a web service to be invoked, and a machine readable description of an execution instruction for the web service to be invoked. One or more processors determine/identify a web service that supports the functionality to be supported and the execution instruction for the web service to be invoked.

20 Claims, 4 Drawing Sheets

(56) References Cited

U.S. PATENT DOCUMENTS

| | | | |
|---|---|---|---|
| 8,010,783 B1* | 8/2011 | Cahill | H04L 63/10 713/155 |
| 8,024,397 B1* | 9/2011 | Erickson | G06F 9/5055 707/602 |
| 8,135,796 B1* | 3/2012 | Slaughter et al. | 709/217 |
| 8,180,847 B2 | 5/2012 | Berkland et al. | |
| 8,271,940 B2 | 9/2012 | Vitanov et al. | |
| 8,271,998 B2 | 9/2012 | Dettori et al. | |
| 8,615,750 B1* | 12/2013 | Narayana Iyer | G06F 8/456 709/203 |
| 8,868,720 B1* | 10/2014 | Nair | H04L 67/16 709/224 |
| 2002/0049749 A1* | 4/2002 | Helgeson | G06F 9/468 709/203 |
| 2002/0174178 A1* | 11/2002 | Stawikowski | H04L 29/06 709/203 |
| 2003/0004746 A1* | 1/2003 | Kheirolomoom | G06Q 10/10 717/104 |
| 2003/0005181 A1* | 1/2003 | Bau, III | G06F 8/34 719/330 |
| 2003/0055878 A1* | 3/2003 | Fletcher | G06F 9/465 709/203 |
| 2003/0135628 A1* | 7/2003 | Fletcher | H04L 29/06 709/229 |
| 2003/0149894 A1* | 8/2003 | Bellinger | G06F 9/4411 726/1 |
| 2004/0030627 A1* | 2/2004 | Sedukhin | G06Q 40/00 705/36 R |
| 2004/0107196 A1* | 6/2004 | Chen et al. | 707/4 |
| 2004/0111525 A1* | 6/2004 | Berkland et al. | 709/231 |
| 2004/0122926 A1* | 6/2004 | Moore | G06F 17/30864 709/223 |
| 2004/0148588 A1* | 7/2004 | Sadiq | G06Q 30/016 717/109 |
| 2005/0021689 A1* | 1/2005 | Marvin | G06F 8/31 709/220 |
| 2005/0091374 A1* | 4/2005 | Ganesan | H04L 67/02 709/225 |
| 2005/0091386 A1* | 4/2005 | Kuno | G06F 17/30566 709/228 |
| 2005/0132381 A1* | 6/2005 | Fiammante | G06F 8/24 719/310 |
| 2005/0160434 A1* | 7/2005 | Tan | G06F 9/465 719/331 |
| 2005/0198188 A1* | 9/2005 | Hickman | H04L 69/329 709/217 |
| 2005/0234873 A1* | 10/2005 | Milligan et al. | 707/3 |
| 2005/0240422 A1* | 10/2005 | Doyle et al. | 705/1 |
| 2006/0004764 A1* | 1/2006 | Kurhekar | H04L 67/16 |
| 2006/0015589 A1* | 1/2006 | Ang | H04L 67/34 709/220 |
| 2006/0161563 A1* | 7/2006 | Besbris | G06F 9/445 |
| 2006/0265720 A1* | 11/2006 | Cai | H04L 67/16 719/330 |
| 2006/0271537 A1 | 11/2006 | Chandrasekharan et al. | |
| 2007/0130571 A1* | 6/2007 | Ringseth | H04L 67/02 719/313 |
| 2007/0201654 A1* | 8/2007 | Shenfield | G06F 9/44521 379/201.01 |
| 2008/0140759 A1* | 6/2008 | Conner | H04L 67/16 709/201 |
| 2008/0140857 A1* | 6/2008 | Conner | G06Q 10/00 709/236 |
| 2008/0168150 A1* | 7/2008 | Chen | G06Q 10/06 709/206 |
| 2008/0168420 A1* | 7/2008 | Sabbouh | G06F 17/30893 717/104 |
| 2008/0208820 A1* | 8/2008 | Usey | G06F 17/30616 |
| 2008/0216052 A1* | 9/2008 | Hejlsberg | G06F 9/44 717/114 |
| 2008/0235710 A1* | 9/2008 | Challenger | G06F 9/5027 719/316 |
| 2008/0281904 A1* | 11/2008 | Conrad | G06Q 10/0631 709/203 |
| 2009/0006638 A1* | 1/2009 | George et al. | 709/230 |
| 2009/0113401 A1* | 4/2009 | Cipresso | G06F 8/51 717/136 |
| 2009/0204612 A1* | 8/2009 | Keshavarz-Nia et al. | 707/6 |
| 2009/0292797 A1* | 11/2009 | Cromp | G06Q 10/10 709/223 |
| 2010/0017368 A1* | 1/2010 | Mao et al. | 707/3 |
| 2010/0057917 A1* | 3/2010 | Xu | G06F 9/5055 709/226 |
| 2010/0100525 A1* | 4/2010 | Huang | 707/609 |
| 2010/0114620 A1* | 5/2010 | Diament | G06F 8/36 709/203 |
| 2010/0142401 A1* | 6/2010 | Morris | G06F 17/30241 370/254 |
| 2010/0145963 A1* | 6/2010 | Morris | H04L 29/12066 707/758 |
| 2010/0153697 A1* | 6/2010 | Ford | G06F 21/31 713/2 |
| 2010/0205237 A1* | 8/2010 | El-Nakhily et al. | 709/203 |
| 2011/0099194 A1* | 4/2011 | Trevor | G06F 17/30896 707/769 |
| 2011/0179007 A1* | 7/2011 | Shi | 707/706 |
| 2012/0109937 A1* | 5/2012 | Liensberger | G06Q 10/10 707/722 |
| 2012/0131473 A1 | 5/2012 | Biron, III | |
| 2012/0179503 A1 | 7/2012 | Chalana et al. | |
| 2012/0209903 A1* | 8/2012 | Salt | G06F 9/5055 709/203 |
| 2012/0297492 A1* | 11/2012 | Court | G06F 9/468 726/29 |
| 2013/0013649 A1* | 1/2013 | El Husseini | G06Q 10/10 707/804 |
| 2013/0080507 A1* | 3/2013 | Ruhlen et al. | 709/203 |
| 2014/0101290 A1* | 4/2014 | Johnston | G06F 17/30861 709/219 |
| 2015/0334161 A1* | 11/2015 | Bullotta | G06F 9/4443 709/201 |

OTHER PUBLICATIONS

D. Penick, "Loose Coupling Through Web Services", SAP Community Network, Walldorf, Germany, Last Edited Apr. 2, 2012, Retrieved Nov. 26, 2013, pp. 1-3.

Anonymous, "Woggle—Web-Service Search Engine: Web-Service Search", University of Washington Database Group, Retrieved Nov. 26, 2013, pp. 1-2.

* cited by examiner

WEB SERVICES

This application is based on and claims the benefit of priority from United Kingdom (GB) Patent Application 1300415.5, filed on Jan. 10, 2013, and herein incorporated by reference in its entirety.

BACKGROUND

This invention relates to computer software applications, and more particularly web-based computer software applications known as web services.

Web services are web-based computer software applications which interact with other applications, such as other web services or software applications. Web services may be made publicly available or may be deployed in private environments, such as within a private organisation to enable divisions and/or subsidiaries to exchange data.

Web services are becoming increasingly more centralized in the design. The centrality of web services has led to intensive standardization work related to the documentation of web services and the discovery of web services according to metadata they publish;

Despite such advances, a developer of a software application is still expected to invest considerable time into the integration of web services into the software application. Currently, if a developer wishes to integrate a web service into a software application, this has to be done using 'tight coupling', wherein the developer commits to the use of a specific web service and explicitly references that particular web service in the program code of the software application. This has the following drawbacks or limitations:

Web services available at the time of developing the program code may no longer be available at the time of executing the code. It may therefore no longer be possible to use a software application that is tightly coupled to a non-existing web service. This even holds for a case when the web service is available but resides at a different location (e.g. on a different URL).

New web services may become available which provide the same or improved functionality compared to a web service that is tightly coupled to a software application. Execution of the software application may therefore invoke an out-of-date or superseded web service. A great deal of the time and effort can be required to manually search for an appropriate web service when developing the program code of a software application. For example, different repositories (or versions of the same repository) expose different interfaces for searching for a web service, which makes the searching process tedious.

SUMMARY

A method, system, and/or computer program product invokes a web service in a software application. A software application comprises a machine readable description of a functionality to be supported by a web service to be invoked, and a machine readable description of an execution instruction for the web service to be invoked. One or more processors determine/identify a web service that supports the functionality to be supported and the execution instruction for the web service to be invoked.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Figure 1:
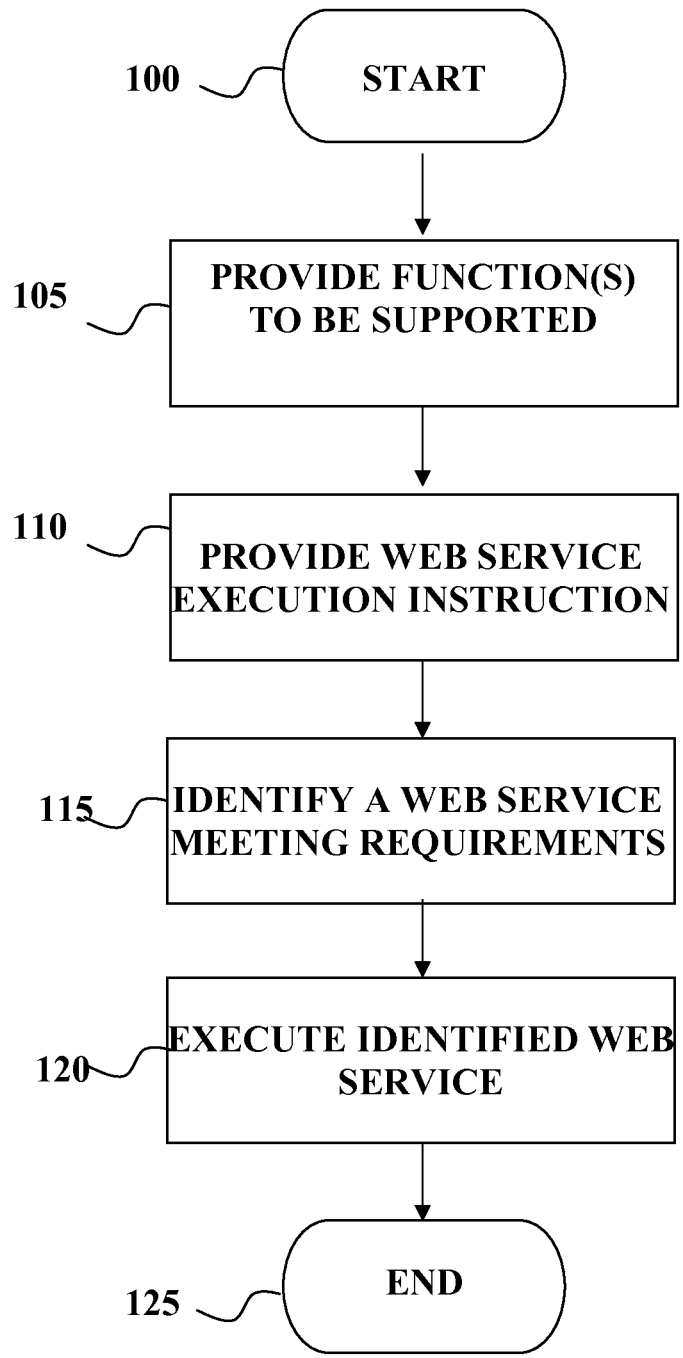
FIG. 1 is a flow diagram of a method of invoking a web service within a software application according to an embodiment.

Referring to FIG. 1, there is shown a flow diagram of a method according to an embodiment of the invention.

The method starts in step 100 and proceeds to step 105 in which a user provides a program code containing a machine readable description of functionality required to be supported by a web service.

Next, in step 110, the user provides program code containing a machine readable description of a web service execution instruction. This web service execution instruction is a statement representing an instruction to execute or invoke a web service using one or more parameter values that are detailed in the statement.

Although the above steps 105 and 110 have been detailed above as being undertaken separately, it is to be understood that these steps 105 and 110 may alternatively be completed simultaneously (i.e. at once) by a user providing the program code of a software application that contains a machine readable description of both a required functionality and a web service execution instruction. In other words, the provision of a software application having the appropriate machine readable statements may complete both steps 105 and 110.

It will be understood that, as a result of completing steps 105 and 110, the features of a web service that are desired by the creator of the machine readable descriptions have been identified.

Next, in step 115, a web service is identified that will support the required functionality and execution instruction. In this example, this is done by firstly searching a database of web services to identify web services that provide the required functionality. For each the web services identified as providing the required functionality, information about supported execution instructions are then retrieved from the database for comparison with the execution instruction provided in step 110. If the comparison determines that an identified web service does not support the execution instruction, the web service is disregarded. Conversely, if the comparison determines that an identified web service does support the execution instruction, the web service is determined to meet the necessary requirements.

If only one web service is determined to meet the necessary requirements, that web service is selected for use. However, if more than one web service is determined to meet the necessary requirements, one of the web services is selected for use according to one or predetermined preferences which take in account properties such as: age of the web service; software version of the web service; cost of the web service; proprietor/owner of the web service; processing requirements of the web service; or operating system requirements of the web service.

The web service selected for use is then executed in accordance with the execution instruction in step 120. It will be understood that, as a result of step 115, the executed web service will provide the required functionality. Despite this, the web service may have been unknown or even not in existence when the program code was created.

The method then ends in step 125.

Figure 2:
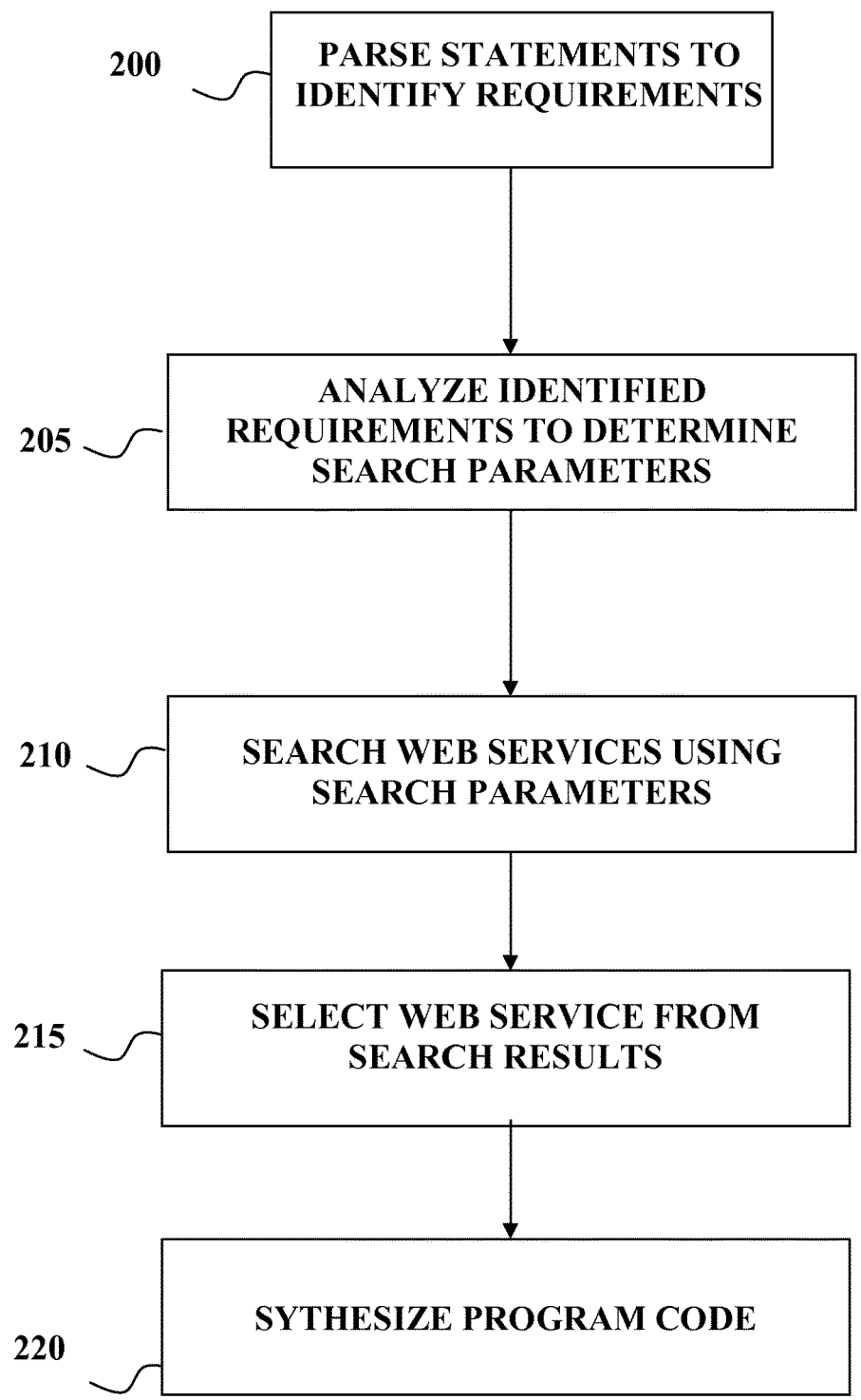
FIG. 2 shows a flow diagram of the step of identifying a web service according to another embodiment.

Turning now to FIG. 2, there is shown a flow diagram of the step of identifying a web service according to another embodiment. Thus, the FIG. 2 shows an alternative to step 115 of the embodiment described above (and shown in FIG. 1).

Firstly, in step 200, the machine readable descriptions (otherwise referred to as statements) are parsed to identify the required functionality and web service execution instruction(s). By way of example, below there is detailed a simplified sample of exemplary machine readable descriptions placed in the program code of a software application by a developer (where the programming language is similar to SQL).

```
Let S = Select From *
  Where Description Contains ("location" or "locator" or "finder")
Let X = Select From S
  Where Name Contains ("business" and ("find" or "locate"))
Then A[ ] = X("Restaurant", 1, GPS::GetCurrentCoordinates( ))
```

The functionality expressed in the example above is that of finding a restaurant up to one kilometer away from a user's current location. Here, the first Select statement requires that a web service's description contains one (or more) of the strings "location", "locator" and "finder". The second Select statement traverses the operations of a matching web service, and requires that an operation's name contains both "business" and (at least) one of "find" or "locate". Finally, the last line represents an invocation (i.e. an execution instruction) of a matching operation, including the arguments to be used Next, in step 205, the identified requirements are analysed in order to determine search parameters or queries. Here, this step employs heuristic reasoning, such as identifying not only the keywords specified by the developer (such as "location", "locator" and "finder" in the example above), but also using synonyms of these keywords. This may allow flexibility in the discovery of web services by relaxing the requirement for exact matching of a descriptor (which may otherwise be restrictive). The step also uses use context information. For example, the domain to which the software application belongs is detected use it as an additional parameter for determining requirements of a web service.

Using the search parameters determined in step 205, the method then undertakes searching of available web services in step 210. Here, a web service searching program is used in conjunction with the determined search parameters so as to identify web services that match the search parameters.

The identified web services (i.e. the search results) are then analysed in order to select a single web service in step 215. Here, many considerations may be accounted for when determining which web service to select so as to ensure an optimal match for the software application's requirements. Such considerations employ the following concepts:

Prioritize web services from a certain domain over web services belonging to other domains. For example, if a web service belongs to the domain of the software application, it is preferred to use the web service over another web service that belongs to a different domain;

Web services may impose financial charges for use, and so it may be preferable to select an appropriate web service that minimizes such financial cost;

Web service selection may take historical information into account. For example, preference may be given to web services that have been used before and/or caused fewer failures to a software application. Thus, a scoring system may be employed which gives preference to web services by scoring higher as a result of their frequency of their use or some usage measure;

It may be preferable to simply select a web service arbitrarily or at random; and Web service selection may be based on minimizing the number of web services used by the software application. For example, a compiler may select a web service that has already been used or selected by another piece of code of the software application. This approach may help to minimize the costs if the web services impose financial charges for their use.

It will be understood that various considerations may be made when selecting a web service to use from a plurality of available web services. The optimal selection may therefore depend on the considerations taken into account and it is quite possible that different software applications will need to employ different selection criteria in step 215.

Turning back to the exemplary code given above (in relation to step 200), an instance of this example discovers that a web service represented by blocator, and specifically, the FindBusinesses operation, are compatible with the requirements specified by the exemplary code.

After having selected a web service in step 215, the method continues to step 220 in which program code for the software application is synthesized so as to enable execution of the code and subsequent invocation of the web service. Here, a compiler adds appropriate dependencies (e.g., a web reference in the case of Java or .NET), such that the web service (eg. blocator) proxy can be resolved (by binding the code with the URL where the web service is located (e.g. with the URL: www.locationexplorer.com/find/BusinessLocator.asmx?wsdl). For the example detailed above, the compiler would translate the exemplary code into the following synthesized code:

```
BusinessLocator blocator = new BusinessLocator( );
A[ ] = Blocator->
  FindBusinesses("Restaurant",1,GPS::GetCurrentCoordinates( ));
```

Figure 3:
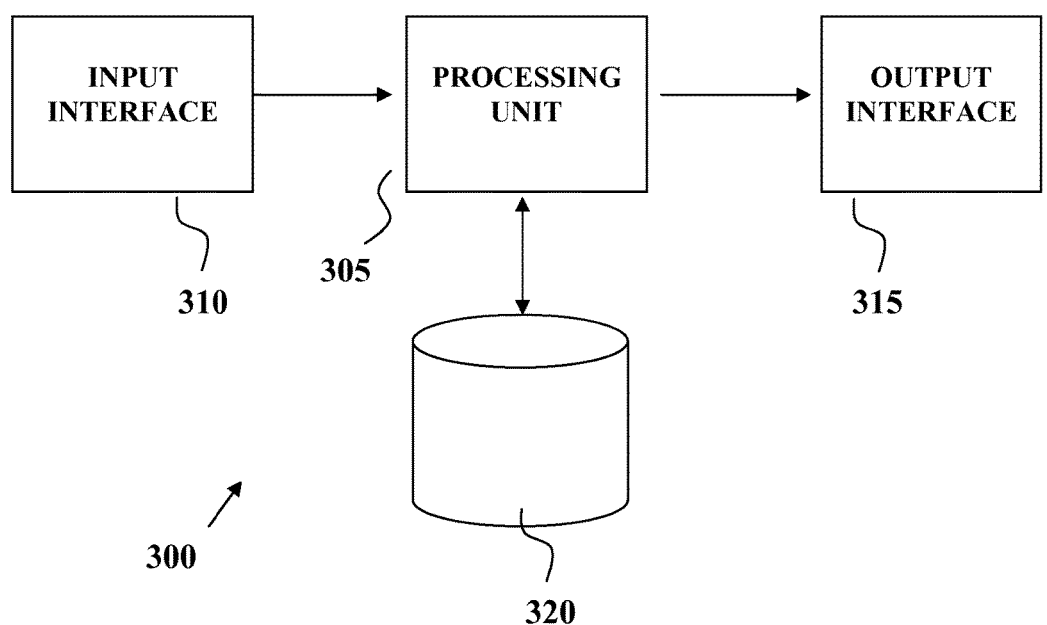
FIG. 3 illustrates a schematic block diagram of a system according to an embodiment.

Referring now to FIG. 3, there is illustrated a schematic block diagram of a system 300 according to an embodiment. The system 300 is adapted to invoke a web service from within a software application. The system 300 comprises a processing unit 305 having input 310 and output 315 interfaces, and a data storage unit 320 connected to the processing unit 305.

The input 310 interface is adapted to receive inputs and/or instructions from user, and the output interface 315 is adapted to provide information (such as outputs of a software application, for example) from the processing unit 305 to the user.

The data storage unit is adapted to store one or more descriptions of available web services. In other words, the data storage unit 320 is adapted to store a database of available web services. Here, the data storage unit 320 is also adapted to store statistical information about the web services, such as data regarding web service usage, the stability of web services over time, and web service performance information.

The processing unit 305 is adapted to execute a computer program which, when executed, causes the system to implement the steps of a method according to an embodiment, for example the steps as shown in FIG. 1.

The processing unit 305 is adapted to receive, via the input interface 310, the program code of a software application, the program code containing a machine readable description of required web service functionality and a web service execution instruction. Based on the machine readable descriptions provided in the program code, the processing unit 305 determines the features of a web service that are desired by the creator of the program code and searches information (regarding available web service) stored in the data storage unit 320 to identify web services that support the required functionality and execution instruction.

If only one web service is determined to meet the necessary requirements, that web service is selected for use by the processor 305. However, if more than one web service is determined to meet the necessary requirements, one of the web services is selected for use according to one or more predetermined preferences. Here, the processor 305 is also adapted to receive, via the input interface 310, a user indication of such preferences. Thus, using such user-supplied information, the processor 305 determines which web service to use.

The processor 305 then synthesizes program code for the software application so as to enable execution of the code and subsequent invocation of the selected web service. Finally, the processor 305 executes the software application (included the synthesized code) and thus invokes the selected web service as part of running the software application. The result(s)/output(s) of the executed software application are provided to the user via the output interface 315. Thus, the processor 305 is adapted to identify and invoke a web service within a software application, even though the software application was not tightly coupled to a particular web service. This is done at run-time of the software application, and is based on a loose identification of web service requirements provided by the program code author at the time of coding the software application.

It is also noted that in this embodiment, the processor 305 injects a profiling code into the synthesized program code that is adapted to performance information about the web service when it is used. Such performance information is automatically provided to the processor (via the input interface 310) and subsequently stored in the data storage unit 320 for future use by the processor 305 in determining which web service to select.

Figure 4:
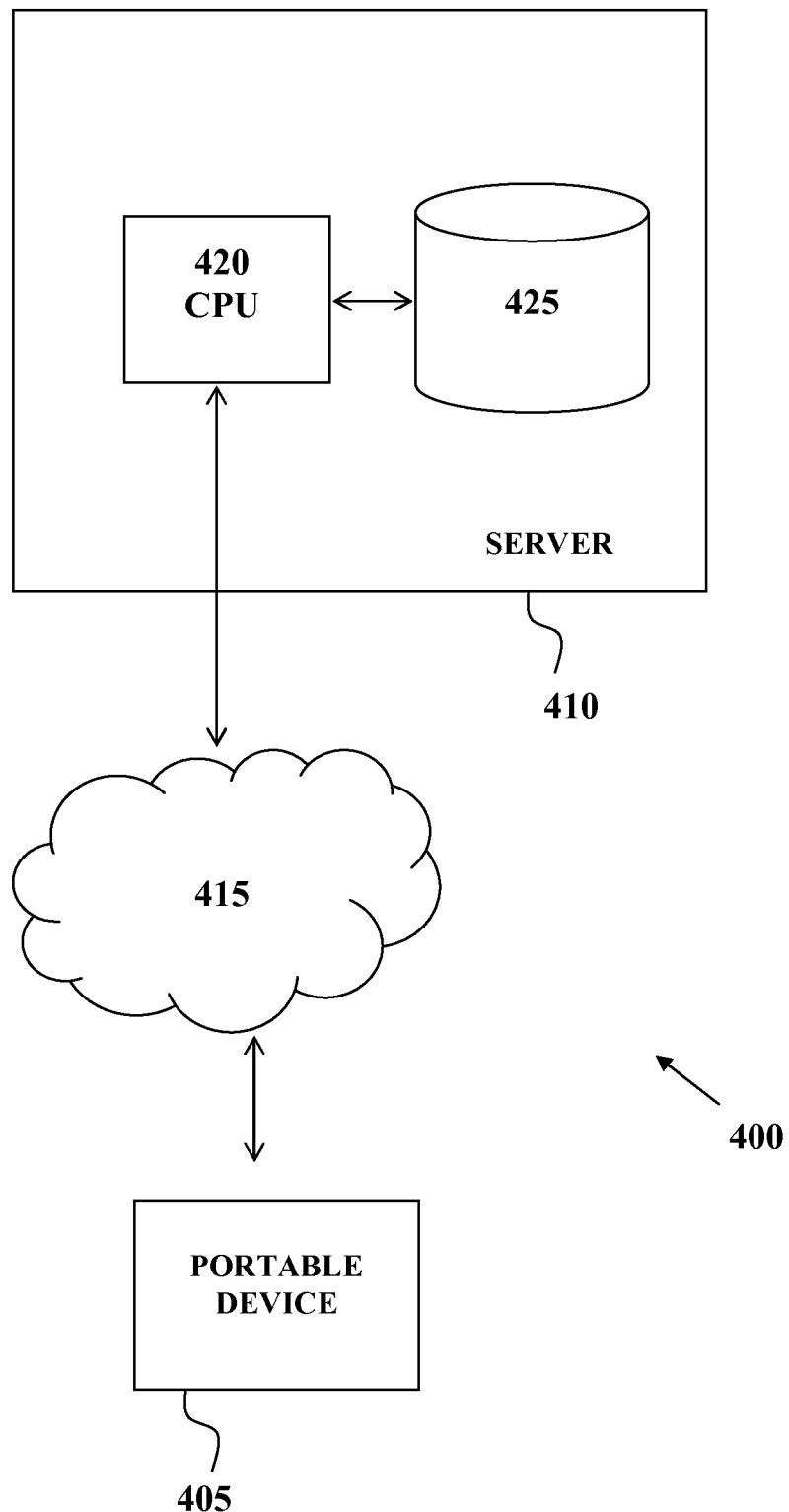
FIG. 4 illustrates a schematic block diagram of a system according to another embodiment.

Referring now to FIG. 4, there is illustrated a schematic block diagram of a system 400 according to another embodiment. The system 400 is adapted to invoke a web service from a software application. The system comprises a portable device 405 and a server 410. The portable device 405 is adapted to communicate with the server 410 via a communication link 415 (such as the internet, for example).

The portable device 405 comprises a software application comprising program code containing a machine readable description of required web service functionality and a web service execution instruction. The portable device 405 is adapted to communicate the program code to the server 410 via the communication link 415.

The server comprises a central processing unit (CPU) 420 and a data store 425 which stores a database of web services.

The central processing unit 420 of the server 410 is adapted to analyse received program code in conjunction with the database of web services to identify a web service to employ. The central processing unit 420 then changes the program code so as to replace the machine readable description (provided in the program code) with synthesized program code (contain an execution instruction) for invoking the identified web service. The modified program code is then provided to the portable device 405 (via the communication link 415) for execution. Execution of the modified program code than causes the identified web service to be invoked by the software application.

It will be understood that the proposed embodiments implement a concept for reducing coupling to specific web services within software applications. Rather than relying on the specification of a particular web service within the program code of software application, embodiments may analyse machine readable descriptions of web service requirements in order to identify a web service that meets the described requirements. Program code for invoking the identified web service may then be incorporated into the software application so that it invokes the identified web service when run. It will be understood that this means the author of the program code need not know which web service to use at the time of creating the program code, and determination of the web service to use can be delayed until a later time (when the software application is executed, for example).

Embodiments may thus provide for run-time resolution of a required web service. In other words, the time of executing a software application, the description of the web service requirements contained in the program code of the software application may be utilized to search for a web service in place of the reference to an unspecified service created a compile time of the application. This may thus provide a pseudo auto-upgrade capability for the software application by ensuring the latest and most appropriate web service is invoked by the software application every time it is executed.

Embodiments may consult preconfigured online registries and perform a query using either the API specified by the UDDI/WSRR or using WS-Discovery protocol to work with the discovery proxy. When web services are found, embodiment may choose the most appropriate web service according to a predefined selection policy and create a proxy for the web service. If no web services are found then it is possible to use a default alternative.

Embodiments may be captured in a computer program product for execution on the processor of a computer, e.g. a personal computer or a network server, where the computer program product, if executed on the computer, causes the computer to implement the steps of a method according to an embodiment, e.g. the steps as shown in FIG. 1 and/or FIG. 2. Since implementation of these steps into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, memory card, network-area storage device, internet-accessible data repository, and so on, may be considered.

Thus, presented herein is a novel method, system, and/or computer program product for invoking a web service from within a software application. Embodiments provide for the expression of a web service in the program code of a software application based on its required functionality. Such an approach enables the discovery and integration of a web service to be offloaded from a developer to a program compiler or execution system. Thus, a developer need not commit to a particular web service, but instead only specify one or more requirements of a web service. A compiler or run-time system may then be used to analyse the expression of the web service requirements and find a web service that meets the requirements.

Embodiments may thus provide a method or system for permitting a user to simply specify web service requirements in the program code, rather than defining a specific web service descriptor. This provides the freedom to use the best possible web service available at the time of executing the software application, thereby avoiding the need to use a web service that is out-of-date, non-ideal, or no longer available.

According to an aspect of the invention there is provided a method of invoking a web service in a software application, the method comprising: providing a software application having a machine readable description of a functionality to be supported by a web service to be invoked and a machine readable description of an execution instruction for web service to be invoked; and determining a web service that supports the function to be supported and the execution instruction.

In an embodiment, the step of determining a web service may comprise: analysing the machine readable description of a functionality to be supported so at to determine one or more search parameters; and using the determined one or more search parameters in conjunction with a web service search application.

In an embodiment, the step of analysing the machine readable description of a function to be supported may comprise employing heuristic reasoning to determine on or more alternative descriptions of the functionality to be supported. Furthermore, the web service search application may comprise a web service.

In an embodiment, the step of determining a web service may be undertaken upon executing the software application.

In an embodiment, the step of determining a web service may comprise: if more a plurality of web services are identified as supporting the function to be supported and the execution instruction, selecting one of the plurality of identified web services in accordance with predetermined selection criteria. Furthermore, the predetermined selection criteria take in account at least one of: age of an identified web service; the software version of an identified web service; a cost of an identified web service; the domain of a identified web service; the processing requirements of an identified web service; and historical use of an identified web service.

In an embodiment, the method may further comprise the steps of: generating program code for instructing the execution of the identified web service, and editing the software application to include the generated program code.

In an embodiment, the execution instruction may comprise one or more parameter values to be used by the web service; and wherein the method further comprises the step of executing the identified web service in accordance with the web service execution instruction.

According to another aspect of the invention, there is provided a computer program product for invoking a web service in a software application, wherein the computer program product comprises a computer-readable storage medium having computer-readable program code embodied therewith, the computer-readable program code configured to perform all of the steps of a method according to an embodiment.

According to yet another aspect of the invention, there is provided a computer system adapted to generate a tailored schema description of a web service from a predefined schema description of the web service, the system comprising: a computer program product according to an embodiment; and one or more processors adapted to perform all of the steps of a method according to an embodiment.

Various modifications will be apparent to those skilled in the art. For example, the exemplary machine-readable description detailed in relation to the embodiment of FIG. 2 employs SQL-like syntax. This is because the search for a suitable web service may be much like a database query, where the database is a registry hosting all available web services. However, it will be understood that other machine-readable syntax may be used and only require routine skill to implement.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of invoking a web service in a software application, the method comprising:
   receiving, by a web service server and from a client via an Internet network, a service invocation from program code in a software application, wherein the service invocation is program code that includes a machine readable description of a functionality to be supplied by a web service upon execution of the software application, wherein the service invocation further includes one or more parameter values that are to be satisfied by the web service, and wherein the service invocation utilizes the one or more parameter values when invoking the web service;
   comparing, by the web service server, the service invocation that was received from the client to service invocations found in a database, wherein the database includes a listing of supported service invocations that are supported by known web services, and wherein the database matches the supported service invocations to specific web services from the known web services;
   identifying, by the web service server, a particular web service from the database that supports the service invocation that was received from the client based on said comparing, wherein the particular web service that is identified by the web service server satisfies the one or more parameter values, wherein an identity of the particular web service is unknown by the client when the client sends the service invocation to the web service server; and
   executing, by the web service server and on behalf of the client, the particular web service in accordance with the service invocation that was received from the client, wherein the functionality of the particular web service is integrated into the software application.

2. The method of claim 1, wherein said identifying the web service comprises:

analyzing, by one or more processors, the machine readable description of the functionality to be supported so as to determine one or more search parameters; and using the determined one or more search parameters in conjunction with a web service search application to identify the particular web service.

3. The method of claim 2, wherein said analyzing the machine readable description of the functionality to be supported comprises employing heuristic reasoning to determine one or more alternative descriptions of the functionality to be supported, wherein the heuristic reasoning locates synonyms of keywords in the alternative descriptions of the functionality to be supported.

4. The method of claim 2, wherein the web service search application comprises a web service.

5. The method of claim 1, wherein said identifying the web service is undertaken in response to executing the software application.

6. The method of claim 1, where said identifying the web service comprises:

in response to a plurality of web services being identified as supporting the functionality to be supported, selecting, by one or more processors, one of the plurality of identified web services in accordance with predetermined selection criteria.

7. The method of claim 1, wherein the particular web service is used by an initial execution of the software application, and wherein the method further comprises:

detecting, by the web service server, that the execution of the software application has terminated;

detecting, by the web service server, that the software application has been restarted; and in response to detecting that the software application has been restarted, identifying, by the web service server, another web service, other than the particular web service, to be invoked by the restarted software application, wherein said another web service provides a same functionality as that of the particular web service used during the execution of the software application before being restarted.

8. The method of claim 6, wherein the predetermined selection criteria comprise processing requirements of the particular web service.

9. The method of claim 1, further comprising:

generating, by one or more processors, program code for instructing the execution of the particular web service, and editing the software application to include the generated program code.

10. The method of claim 1, wherein the particular web service is used by a first piece of code within the software application, and wherein the method further comprises:

storing, by the client, a copy of the particular web service at the client;

determining, by a compiler on the client, that the particular web service is appropriate for use by a second piece of code within the software application; and executing, by the client, the copy of the particular web service on the client for use by the second piece of code.

11. A computer program product for invoking a web service in a software application, the computer program product comprising a non-transitory computer readable storage medium having program code embodied therewith, the program code readable and executable by a processor to perform a method comprising:

providing a software application from a web service server to a client via a network, wherein the software application comprises a machine readable description of a functionality to be supported by a web service to be invoked and a machine readable description of an execution instruction for the web service to be invoked, wherein the machine readable description of the execution instruction is a statement representing an instruction used to invoke the web service using one or more parameter values that are detailed in the statement, and wherein the execution instruction utilizes the one or more parameter values when invoking the web service;

identifying the web service that supports the functionality to be supported and the execution instruction for the web service to be invoked, wherein an identity of the web service that supports the functionality to be supported is unknown by the client when the client sends the program code comprising the machine readable description of the functionality to be supported by the web service to the web service server; and executing, on behalf of the client, the identified web service in accordance with the execution instruction, wherein a functionality of the identified web service is integrated into the software application.

12. The computer program product of claim 11, wherein said identifying the web service comprises:

analyzing the machine readable description of the functionality to be supported so as to determine one or more search parameters; and using the determined one or more search parameters in conjunction with a web service search application to identify the particular web service.

13. The method of claim 6, wherein the predetermined selection criteria comprise a historical use of the particular web service, wherein the particular web service is being selected for use with a first piece of code in the software application, and wherein the historical use identifies a previous use of the particular web service by a second piece of code in the software application.

14. The method of claim 1, further comprising:

ranking, by the web service server, multiple web services available from the web service server according to how often the web services have been selected for use by the software application, wherein each of the multiple web services provide the functionality requested by the client; and identifying, by the web service server, a first web service, from the multiple web services, that has been selected for use by the software application more often than any other web service from the multiple web services as the particular web service.

15. The computer program product of claim 11, wherein said determining the web service is undertaken in response to executing the software application.

16. A computer system comprising:

a processor, a computer readable memory, and a computer readable storage medium;

first program instructions to provide a software application from a web service server to a client via a network, wherein the software application comprises a machine readable description of a functionality to be supported by a web service to be invoked and a machine readable description of an execution instruction for the web service to be invoked, wherein the execution instruction comprises one or more parameter values to be used by the web service, and wherein the machine readable description of the execution instruction is a statement representing an instruction used to invoke the web service using one or more parameter values that are detailed in the statement;

second program instructions to identify the web service that supports the functionality to be supported and the execution instruction for the web service to be invoked, wherein an identity of the web service that supports the functionality to be supported is unknown by the client when the client sends the program code comprising the machine readable description of the functionality to be supported by the web service to the web service server; and third program instructions to execute the identified web service in accordance with the execution instruction, wherein a functionality of the identified web service is integrated into the software application; and wherein said first, second, and third program instructions are stored on said computer readable storage medium for execution by said processor via said computer readable memory.

17. The method of claim 1, further comprising:

identifying, by the web service server, multiple web services that support the service invocation that was received from the client;

ranking, by the web service server, the multiple web services according to an age of the multiple web services; and selecting, by the web service server, a newest web service as the particular web service from the multiple web services based on the ranking.

18. The method of claim 1, further comprising:

determining, by one or more processors, the web service that supports the functionality to be supported at a compile time of the software application, wherein an auto-upgrade capability for the software application is provided by ensuring that a version of an identified web service is called every time the software application is compiled.

19. The method of claim 1, wherein the machine readable description of the functionality to be supplied by the web service is a non-executable description that is non-executable by a processor, and wherein the method further comprises:

replacing, by the client, a machine readable description of an execution instruction included in the software application with synthesized program code that is executed for invoking the particular web service, wherein the synthesized program code comprises profiling code that describes performance information about the identified web service;

storing, in the client, the profiling code;

in response to receiving a request from a compiler in the client for a subsequent web service to be used in a subsequent software application, retrieving, by the client, the profiling code; and comparing, by the client, the retrieved profiling code with performance requirements of the subsequent software application in order to determine whether the identified web service meets the performance requirements of the subsequent software application.

20. The method of claim 1, wherein the functionality of the particular web service that is required by the software application is expressed by a first Select statement and a second Select statement by the client computer, wherein the first Select statement requires that a web service's description of the particular web service contains a first predefined string, wherein the second Select statement requires that operations performed by the particular web service include at least one operation that is named by a second predefined string, and wherein an execution instruction of the software application invokes the particular web service in response to the web service's description containing the first predefined string and the at least one operation being named by the second predefined string.

* * * * *